United States Patent
Smith et al.

(10) Patent No.: US 8,392,268 B2
(45) Date of Patent: Mar. 5, 2013

(54) METHOD AND SYSTEM OF DISPLAYING, MANAGING AND SELLING IMAGES IN AN EVENT PHOTOGRAPHY ENVIRONMENT

(75) Inventors: Caine Smith, Grand Cayman (KY); Brynley Davies, Grand Cayman (KY); Daniel Weil, London (GB)

(73) Assignee: Image Holdings, Grand Cayman (KY)

( * ) Notice: Subject to any disclaimer, the term of this patent is extended or adjusted under 35 U.S.C. 154(b) by 0 days.

(21) Appl. No.: 12/883,947

(22) Filed: Sep. 16, 2010

(65) Prior Publication Data

US 2011/0066494 A1 Mar. 17, 2011

Related U.S. Application Data

(63) Continuation-in-part of application No. 12/874,772, filed on Sep. 2, 2010, now Pat. No. 8,332,281.

(60) Provisional application No. 61/239,398, filed on Sep. 2, 2009.

(51) Int. Cl.
*G06Q 30/00* (2006.01)
(52) U.S. Cl. .................................................. 705/26.1
(58) Field of Classification Search ............... 705/26–27
See application file for complete search history.

(56) References Cited

U.S. PATENT DOCUMENTS

| 306,291 | A | 10/1884 | Smyth |
|---|---|---|---|
| 2,080,995 | A | 5/1937 | Baker et al. |
| 2,091,867 | A | 8/1937 | Martin |
| 2,375,113 | A | 5/1945 | Klammet et al. |
| 2,443,320 | A | 6/1948 | Meyer et al. |
| D156,256 | S | 11/1949 | Kivett |
| D167,835 | S | 9/1952 | James |
| 2,612,168 | A | 9/1952 | Stark |
| 2,852,407 | A | 9/1958 | Wood, Jr. et al. |
| 2,944,586 | A | 7/1960 | Yanulis |
| 2,994,298 | A | 8/1961 | Thomas |
| 3,265,453 | A | 8/1966 | Seide |
| 3,281,259 | A | 10/1966 | Lux et al. |
| 3,498,865 | A | 3/1970 | Paquin et al. |
| 3,551,199 | A | 12/1970 | Forster |
| 3,570,748 | A | 3/1971 | Coyle et al. |
| 3,641,690 | A | 2/1972 | Ehrensaal |
| 3,858,340 | A | 1/1975 | Melanson |
| 3,911,173 | A | 10/1975 | Sprague, Jr. |
| 3,924,013 | A | 12/1975 | Kane |
| 3,944,453 | A | 3/1976 | Chudgar et al. |
| 4,082,854 | A | 4/1978 | Yamada et al. |
| 4,097,893 | A | 6/1978 | Camras |
| 4,234,624 | A | 11/1980 | Linderoth et al. |
| 4,390,387 | A | 6/1983 | Mahn |
| 4,465,926 | A | 8/1984 | Apitz et al. |

(Continued)

FOREIGN PATENT DOCUMENTS

| DE | 10017991 | 1/2001 |
|---|---|---|
| EP | 0644032 | 3/1995 |

(Continued)

OTHER PUBLICATIONS

U.S. Appl. No. 12/442,361, filed Mar. 20, 2009, Goldberg.

(Continued)

*Primary Examiner* — Jeffrey A Smith
*Assistant Examiner* — Ethan D Civan
(74) *Attorney, Agent, or Firm* — Sheridan Ross P.C.

(57) ABSTRACT

A system for displaying photographs is provided. The display system includes a plurality of rotatable carousels that each possess a plurality of slots for receiving folders that hold photographs taken by an event organizer.

27 Claims, 10 Drawing Sheets

U.S. PATENT DOCUMENTS

| | | | |
|---|---|---|---|
| 4,484,971 A | 11/1984 | Wang | |
| 4,525,414 A | 6/1985 | Ohya et al. | |
| 4,528,219 A | 7/1985 | Yamada et al. | |
| 4,559,095 A | 12/1985 | Babbin | |
| 4,580,685 A | 4/1986 | Jorquez | |
| 4,636,609 A | 1/1987 | Nakamata | |
| 4,644,127 A | 2/1987 | La Rocca | |
| 4,791,598 A | 12/1988 | Liou et al. | |
| 4,805,037 A | 2/1989 | Noble et al. | |
| 4,861,404 A | 8/1989 | Neff | |
| 4,902,378 A | 2/1990 | Ouderkirk et al. | |
| 4,916,532 A | 4/1990 | Streck et al. | |
| 4,931,125 A | 6/1990 | Volkmann et al. | |
| 4,936,938 A | 6/1990 | Simpson et al. | |
| 4,941,193 A | 7/1990 | Barnsley et al. | |
| 4,954,393 A | 9/1990 | Jones | |
| 4,979,133 A | 12/1990 | Arima et al. | |
| 4,991,205 A | 2/1991 | Lemelson | |
| 5,056,034 A | 10/1991 | Rucki et al. | |
| 5,096,366 A * | 3/1992 | Bernard et al. | 414/800 |
| 5,101,972 A | 4/1992 | Hunt et al. | |
| 5,132,922 A | 7/1992 | Khan et al. | |
| D328,674 S | 8/1992 | Dokoupil et al. | |
| 5,136,646 A | 8/1992 | Haber et al. | |
| 5,164,992 A | 11/1992 | Turk et al. | |
| 5,176,264 A * | 1/1993 | De Palma | 211/40 |
| 5,189,130 A | 2/1993 | Kageyama | |
| 5,213,900 A | 5/1993 | Friedrich | |
| 5,321,396 A | 6/1994 | Lamming et al. | |
| 5,326,173 A | 7/1994 | Evans et al. | |
| 5,341,943 A | 8/1994 | Fraser | |
| 5,348,604 A | 9/1994 | Neff | |
| D351,513 S | 10/1994 | Kreppein | |
| 5,363,504 A | 11/1994 | Hasuo | |
| 5,381,155 A | 1/1995 | Gerber | |
| D357,311 S | 4/1995 | Yehl | |
| 5,408,080 A | 4/1995 | Zazzu et al. | |
| 5,432,864 A | 7/1995 | Lu et al. | |
| D360,799 S | 8/1995 | Rocco et al. | |
| 5,493,677 A | 2/1996 | Balogh et al. | |
| 5,542,550 A | 8/1996 | Kakavoulis-Perera et al. | |
| 5,549,943 A | 8/1996 | Vicik | |
| 5,550,928 A | 8/1996 | Lu et al. | |
| 5,553,720 A | 9/1996 | Dardashti | |
| 5,554,984 A | 9/1996 | Shigenaga et al. | |
| 5,560,499 A | 10/1996 | Dardashti | |
| 5,566,327 A | 10/1996 | Sehr | |
| 5,572,596 A | 11/1996 | Wildes et al. | |
| 5,576,838 A | 11/1996 | Renie | |
| 5,598,208 A | 1/1997 | McClintock | |
| 5,602,375 A | 2/1997 | Sunahara et al. | |
| 5,618,101 A | 4/1997 | Yeh | |
| 5,629,981 A | 5/1997 | Nerlikar | |
| 5,655,053 A | 8/1997 | Renie | |
| 5,666,215 A | 9/1997 | Fredlund et al. | |
| 5,680,223 A | 10/1997 | Cooper et al. | |
| 5,699,449 A | 12/1997 | Javidi | |
| 5,796,428 A | 8/1998 | Matsumoto et al. | |
| 5,802,208 A | 9/1998 | Podilchuk et al. | |
| 5,840,147 A | 11/1998 | Grimm | |
| 5,947,369 A | 9/1999 | Frommer et al. | |
| 6,031,963 A | 2/2000 | Kitamura et al. | |
| 6,108,437 A | 8/2000 | Lin | |
| D430,443 S | 9/2000 | Dardashti | |
| D435,929 S | 1/2001 | Yeh | |
| 6,217,695 B1 | 4/2001 | Goldberg et al. | |
| 6,238,022 B1 | 5/2001 | Chan | |
| 6,260,296 B1 * | 7/2001 | Carney, Jr. | 40/747 |
| D448,234 S | 9/2001 | Lopez | |
| 6,335,742 B1 | 1/2002 | Takemoto | |
| 6,389,181 B2 | 5/2002 | Shaffer et al. | |
| 6,427,849 B2 | 8/2002 | Swan | |
| 6,430,307 B1 | 8/2002 | Souma et al. | |
| 6,446,376 B1 | 9/2002 | Chan | |
| 6,499,892 B2 | 12/2002 | Beggiao | |
| 6,526,158 B1 | 2/2003 | Goldberg | |
| 6,547,456 B2 | 4/2003 | Wechsler et al. | |
| 6,608,563 B2 | 8/2003 | Weston et al. | |
| 6,646,754 B1 | 11/2003 | Redd et al. | |
| 6,747,690 B2 | 6/2004 | Molgaard | |
| 6,801,641 B2 | 10/2004 | Eraslan | |
| 6,845,913 B2 | 1/2005 | Madding et al. | |
| 6,914,626 B2 | 7/2005 | Squibbs | |
| 6,928,230 B2 | 8/2005 | Squibbs | |
| 6,985,875 B1 | 1/2006 | Wolf | |
| 7,016,532 B2 | 3/2006 | Boncyk et al. | |
| 7,047,214 B2 * | 5/2006 | Wolf | 705/26.8 |
| 7,068,309 B2 | 6/2006 | Toyama et al. | |
| 7,083,052 B1 | 8/2006 | Morle | |
| 7,093,762 B2 | 8/2006 | Silverbrook et al. | |
| 7,130,454 B1 | 10/2006 | Berube et al. | |
| 7,133,740 B1 | 11/2006 | Stenson et al. | |
| 7,340,214 B1 | 3/2008 | Hamberg | |
| 7,343,320 B1 | 3/2008 | Treyz et al. | |
| 7,372,482 B2 | 5/2008 | Smith | |
| 7,430,003 B2 | 9/2008 | Nichols et al. | |
| 7,472,134 B2 | 12/2008 | Kaku | |
| 7,542,605 B2 | 6/2009 | Yoshida | |
| 7,557,937 B2 | 7/2009 | Song | |
| 7,561,723 B2 | 7/2009 | Goldberg | |
| 7,685,428 B2 | 3/2010 | Piersol | |
| 7,738,741 B2 | 6/2010 | Pfleging et al. | |
| 2002/0101519 A1 | 8/2002 | Myers | |
| 2003/0086123 A1 | 5/2003 | Torrens-Burton | |
| 2003/0118216 A1 | 6/2003 | Goldberg | |
| 2004/0008872 A1 | 1/2004 | Goldberg | |
| 2004/0075752 A1 | 4/2004 | Valleriano et al. | |
| 2004/0119831 A1 | 6/2004 | Miyawaki | |
| 2004/0135902 A1 * | 7/2004 | Steensma | 348/231.99 |
| 2004/0156535 A1 | 8/2004 | Goldberg et al. | |
| 2004/0181671 A1 | 9/2004 | Brundage et al. | |
| 2004/0216039 A1 | 10/2004 | Lane et al. | |
| 2005/0047777 A1 | 3/2005 | Molldrem, Jr. | |
| 2005/0093999 A1 | 5/2005 | Yamaya | |
| 2005/0100195 A1 | 5/2005 | Li | |
| 2006/0085477 A1 | 4/2006 | Phillips et al. | |
| 2006/0125930 A1 | 6/2006 | Mindrum et al. | |
| 2006/0203312 A1 | 9/2006 | Van De Sluis et al. | |
| 2006/0265508 A1 | 11/2006 | Angel et al. | |
| 2008/0310688 A1 * | 12/2008 | Goldberg | 382/118 |

FOREIGN PATENT DOCUMENTS

| | | |
|---|---|---|
| EP | 0856972 | 8/1998 |
| EP | 1288798 | 3/2003 |
| JP | 2002/024229 | 4/2002 |
| WO | WO 95/24795 | 9/1995 |
| WO | WO 97/42793 | 11/1997 |
| WO | WO 97/48017 | 12/1997 |
| WO | WO 98/10358 | 3/1998 |
| WO | WO 02/19137 | 3/2002 |
| WO | WO 02/25926 | 3/2002 |
| WO | WO 2004/072897 | 8/2004 |

OTHER PUBLICATIONS

Das et al., "Automatic face-based image grouping for albuming", Systems, Man and Cybernetics, 2003. IEEE International Conference on; vol. 4, Oct. 5, 2003, pp. 3726-3731.

Longbin Chen et al., "Face annotation for family photo management", International Journal of Image and Graphics, World Scientific Publishing Co., Singapore, SG, vol. 3, No. 1, Dec. 30, 2002, pp. 81-94.

Lei Zhang et al., "Automated annotation of human faces in family albums", Proceedings of the 11th ACM International Conference on Multimedia, Berkley, CA, Nov. 4-6, 2003, vol. CONF. 11, Nov. 2, 2003, pp. 355-358.

Loui et al., "Automated event clustering and quality screening of consumer pictures for digital albuming", IEEE Transactions on Multimedia, IEEE Service Center, Piscataway, NJ, US, vol. 5, No. 3, Sep. 1, 2003, pp. 390-402.

Kuchinsky et al., "FotoFile: A Consumer Multimedia Organization and Retrieval System," Proceedings of the SIGCHI conference on Human factors in computing systems: the CHI is the limit, p. 496-503, May 15-20, 1999, Pittsburgh, Pennsylvania, United States.

International Search Report for International (PCT) Patent Application No. PCT/IB10/02558, mailed Jan. 19, 2011.

Written Opinion for International (PCT) Patent Application No. PCT/IB10/02558, mailed Jan. 19, 2011.
International Search Report for International (PCT) Patent Application No. PCT/IB10/02427, mailed Feb. 17, 2011.
Written Opinion for International (PCT) Patent Application No. PCT/IB10/02427, mailed Feb. 17, 2011.
Disney's PhotoPass, www.disneyphotopass.com/, printed Dec. 15, 2010, 2 pages.
Notice of Allowance for U.S. Appl. No. 12/874,772, mailed Oct. 2, 2012 17 pages.

* cited by examiner

METHOD AND SYSTEM OF DISPLAYING, MANAGING AND SELLING IMAGES IN AN EVENT PHOTOGRAPHY ENVIRONMENT

CROSS-REFERENCE TO RELATED APPLICATIONS

This application claims the benefit of U.S. Provisional Patent Application Ser. No. 61/243,082, filed Sep. 16, 2009, the entire disclosure of which is incorporated by reference herein.

This application is also a Continuation-In-Part of U.S. patent application Ser. No. 12/874,772, filed Sep. 2, 2010, which claims the benefit of U.S. Provisional Patent Application Ser. No. 61/239,398, filed Sep. 2, 2009, the entire disclosures of which are incorporated by reference herein.

FIELD OF THE INVENTION

Embodiments of the present invention are generally related to a system for displaying images, such as photographs, and other image related items. Other embodiments of the present invention are generally related to a system that allows customers to purchase event photos and/or videos (images) and that facilitates customer interaction with the purchased images via the Internet. Other embodiments of the present invention are generally related to a system that provides customer or potential customer access to images via a wireless communication device.

BACKGROUND OF THE INVENTION

Individuals attending an event or on a vacation often wish to obtain professional images of the event or special activities if professional images are available. As used herein, the term "event" may mean a single activity or multiple activities over the course of one or more days and the term "sub-event" means a single activity that is part of an event. For instance, a cruise is an event and embarking, disembarking, a formal dinner, and a dance related to the cruise are sub-events. An event may also refer to a charity event, a sporting event, a social event, a business event, a vacation event, or any other event where attendees may desire professional photographs. Theme parks similarly provide photographers associated with specific rides or attractions or are located throughout the park to take photographs of individuals, families, or groups of people. Event holders, such as a cruise line, often offer for sale photos of the attendees by displaying images taken at the event in a centralized location with the hope that one or more attendees will review and purchase one or more photographs. The event holder may offer this service through its own staff or through a third party. The purchased photographs are then provided to the customer immediately or later, for example, by delivery to the customer's room. One advantage of such a system is that finished products are placed in the hands of potential customers, which has been found to facilitate sales. This method of operation—taking a photo, editing and printing the photo, displaying the photo in a gallery and offering that photo for sale has been employed for a number of years. One of skill in the art will appreciate that this method of selling photographs, however, is associated with an increased time and cost burden related to providing, editing and displaying photos that may never be purchased.

Photographs not purchased are discarded which is wasteful and environmentally unsound. Some event holders have attempted to reduce this waste by providing one or more viewing terminals that allow potential customers to review digital versions of the images. The terminals often become crowded as many individuals want to see their photos at or about the same time, for example, during or following a sub-event such as a formal dinner. Digital files also take time to locate or access and upload for immediate printing and purchase. This can lead to delays and customer frustration.

Another known method involves selling the rights to images prior to an event or to offer photos electronically for purchase during or post event. Instead of the event holder or photographer maintaining exclusive possession and control over the digital versions of the images, the images may be stored on a portable storage media like a CD, DVD, memory card or thumb drive and are provided at a cost to the customer. The system allows the customer to use, copy, and modify the purchased images. The drawback of this method is minimal interaction between the event holder and/or photographer and the customer. Thus, opportunities to sell related collateral items, such as calendars, coffee mugs, tee shirts, etc. that incorporate the images, are reduced, or lost to the event holder or photographer. As used herein, the terms "image-related items" and "image-related products" are used synonymously with the term "related collateral items".

One other disadvantage of the prior art method is that its effectiveness is a function of the size and length of the event. Simply put, the amount of photos associated with an event is directly proportional to the number of attendees and the length of the event. For example, very large cruise ships hold thousands of passengers and extend for days and sometimes weeks. Thus the quantity of displayed photos increases dramatically. It follows that the time it takes for potential customers to find and review their photos will increase which translates to crowding. Increased crowds often lead to customer frustration and could lead to lost sales. To make matters worse, the event hosts will often condense and consolidate older photographs, which makes finding a particular photo difficult for those potential customers who may wait until near the end of the event to review photos for potential purchase.

Another disadvantage with existing display systems is that they do not offer related collateral items, such as photo CD's, books, post cards, calendars etc. These items must be ordered. Some attendees may not think to order or have the patience to construct and order image-related items. Thus, it would be beneficial to offer image-related products for the same reasons articulated above—placing finished products in a potential customer's hands tends to facilitate sales.

Thus, there is a long felt need to provide an image display system that enhances customer access to their images, facilitates increased access to images by a large number of potential customers simultaneously, and facilitates purchase of image-related items by potential customers at the same time.

SUMMARY OF THE INVENTION

It is one aspect of the present invention to provide a photo delivery system that allows customers and potential customers to receive, interact, and purchase photos related to an event. One embodiment of the present invention is a computer software program, which may be accessed via the Internet, that employs a rich Internet application, such as Adobe® Flash, Adobe AIR, Java®, and other similar applications known to those in the art to simplify image design that enables enhanced image review and editing. In operation, images associated with an event are taken by a photographer or videographer employed by an event holder, and sold to an attendee/customer on a CD, DVD, Flash drive, thumb drive, via email, via the Internet, via a specialized intranet, or other similar media (hereinafter "electronic media"). The customer accesses the images by installing a computer application, either embedded in the electronic media received from the event holder or otherwise obtained by the customer, for example, via the Internet, an email, an intranet, or an application installed on a wireless communication device. The application allows the individual to access the purchased images in a native format, save a copy of the images, and manipulate the images as desired using a computer, including a desktop, laptop, notebook, smart phone, iPad®, Kindle®, or similar wireless device. The application would also allow customers to order professional printing services, image enhancement or collateral items incorporating one or more of the images through a designated website hosted by the event holder or authorized third party. With respect to image enhancement, some embodiments contemplate facilitating interaction between the customer and event holder, or image expert employed thereby, wherein the customer may have the ability to request specific editing be performed on a particular image they have purchased. This interaction allows the image to be cropped, color enhanced, or altered using any other available techniques by a third-party professional, thereby relieving the event holder from the task of editing an image in a way that may not be acceptable or desired by the customer. As image editing and printing are no longer required, time and costs are reduced, including reduced waste costs.

It is another aspect of the present invention to provide an application that can be used in an online or offline mode. The online mode will allow users to connect to the Internet and increase functionality and features provided by the application that are associated solely with the website. Access may also be arranged through an intranet, such as a network available solely on a cruise ship. Working online also allows the user to receive or access automatic upgrades to the application or at least be offered the opportunity to receive an upgrade. In the offline mode, core functions of the application would be available, such as the ability to manipulate and create new images and image products. Once the application is connected to the Internet or intranet, any edited photos and requests for image products may be synched to the event server for fulfillment. As used herein, "event server" means a database containing event images and interactive application software hosted by the event holder or an authorized third party. It is also contemplated that a customer's altered images may be synched or otherwise uploaded to an event server to be viewed by other interested parties or individuals, such as relatives, friends or acquaintances met at the event, who would have the ability to access and purchase the edited or unedited images. Similarly, the user may be able to upload to the server images taken by the user at the event.

In one embodiment of the present invention, a mobile application is provided for installation onto a mobile communication device such as a Droid® phone, iPhone®, Blackberry®, smart phone or personal digital assistant (PDA). The mobile application device will allow users to access the system prior to, during, or after an event in the same manner as accomplished on a home computer. As such, event specific details would be associated with the user's mobile device. In another embodiment of the present invention involving mobile or wireless devices, the user would then have the ability to notify the event organizer via the mobile device that a particular image or images were desired for purchase. An application resident on the mobile device could transmit a signal to the event server that would contain data identifying the customer and the image. Because the application is loaded on the mobile device, sufficient information has been gathered by the application or entered by the user identifying the user (name, mobile phone number), delivery details, and payment information. Features of the software application resident on the mobile device would also allow the individual to select or designate photos as they are being taken. For example, using the application, a signal is sent by the user's mobile device to a designated recipient. The signal includes a user identification and a time stamp or image specific identifying information, such as a location using global positioning technology. The camera equipment taking the images may be tied into the event server. As used herein, the term "event server" comprises the hardware and operational software that stores images and customer information, provides access to images, and permits copying and manipulation of images. The event server may be located at the event, such as on a cruise ship or at a particular resort or theme park, and following the event the images and other event-specific information may be transferred to a different event server located at a different location such as a centralized server hosting information from multiple events. In this way, the particular image will be located by matching the user and other identification information. The images may be sent to the user electronically for review and possible purchase. Alternatively, a user specific or image specific code may be sent to the server by the user's wireless device when prompted by the user. For example, sending a text message to a specific number associated with a specific photographer or videographer coupled with a time stamp would allow the event holder to forward the designated digital image directly to the user in real time or at a later time. Alternatively, an individual may pre-purchase rights to all photos of the event. Images of the individual's photos would be directly sent to their individual account, to their email or some other account associated with and accessible by the user. Further still, and as explained in more detail herein, the designated images may be printed and placed in a unique folder associated only with the purchaser and displayed or located in a designated display area.

It is thus one aspect of the present invention to provide a method of providing digital images to a customer comprising: taking a plurality of images of a customer at an event; forwarding digital versions of the images to the customer; providing a software application to the customer; allowing the software application to establish a connection to an event server that allows the customer to view the images and to purchase image related items; and allowing the user to copy and manipulate purchased images.

It is another aspect of the present invention to provide a method of providing digital images to an individual comprising: obtaining an image of the individual; receiving a signal indicating that the individual wishes to obtain the image; matching the individual with the image; and delivering the image to the individual. In one embodiment, the image or images may be printed and positioned in a physical folder uniquely associated with the purchaser. In this way, only desired images are printed. For marketing purposes, however, the event holder may create additional images or image-related products, not requested by the purchaser, and place them in the folder with the expectation the purchaser may also purchase one or more of these additional products. In another embodiment, the individual may be notified by a text message with instructions to access an image at a display carousel or by using an image viewing application. Alternatively, communication may be by an email message with instructions to access an image viewing application, an email message sent to customers who already have access to an appropriate image viewing application where the message is sent using the application or by using a conventional email account, a text message with a link to the image, an email message with a link to the image, a text message with a link to a website for accessing the image, an email message with a link to a website for accessing to the image, a phone call, a voice mail, a UPC code, or a QR code or by other notification methods known to persons of skill in the art.

As previously noted, it is also one aspect of the present invention to provide an improved image display system that employs carousels that receive and store customer-specific folders. This display system may be utilized in combination with or independent of the other delivery methods described herein. The folders may contain images taken of an event attendee and any other image-related items that are offered for sale. The folders are organized, sorted, and located by using a unique attendee specific code that may help the event organizer link an image with an attendee. One advantage realized by this embodiment of the present invention is that a large number of folders, and thus images and image related products, may be stored together in a single, defined area without affecting attendee access to the photographs.

It is another aspect of the present invention to provide a display system that allows for multiple products to be displayed and sold from a centralized area over a period of time. For example, in a four-thousand guest cruise ship operating on a seven day cruise market, photos are taken at many events—dinners, parties, embarkation, disembarkation etc. One embodiment of the present invention employs photo recognition techniques to link photographs, digital images, etc. with attendees. The linked photographs are printed, sorted, and further linked to an attendee-specific code, and placed within respective attendee folders based upon attendee codes. The attendee-specific folders are placed in a carousel or rack for selective access. One of skill in the art will appreciate that the folder may, alternatively, be delivered to the attendees' cabin, room, etc. for review.

After the folders are placed within the display device, attendees are advised to look for their photographs at the display area. Attendees may be guided by signage and/or staff to a particular carousel that contains their folder. Notification that images are ready may be sent to a room or cabin television, via email, via the internet or intranet, to an attendee's smart phone. The carousels may be labeled alphabetically and further identified alphabetically by last name. The location or identify of the display carousel containing the attendee's folder may also be listed on their room key, charge card or other device given to them by the venue or event holder. For example, often cruise ships provide a key card that is linked to a passenger's credit card that allows passengers to charge items to their room. Similarly, a key may also provide the location of their folder. Other embodiments provide a card reader positioned in the general vicinity of the carousels that allow the key or other identification device to be scanned, swiped, or otherwise accessed by the display system that would remind the attendee of the display area and folder location. Still other embodiments of the present invention contemplate a visual indication of a folder location triggered when a room key or other identification device is accessed, e.g. swiped. The visual indication may comprise, for example, blinking lights on the carousel and/or the specific location on the carousel containing the folder. It is contemplated that each folder will have a unique identifier or code, in some instances located on the spine, so it can easily be found. The identifier and folder may also be color coded and coordinated with each carousel and/or level thereof. A coordinated color identification may also be added to the attendee's room key. Coding may be an alpha-numeric label, a bar code, radio frequency identification tag or a combination of these and/or other known identification techniques. Another "visual" indicator or notice to attendees may comprise a text, email or other message sent from the event server or the display system to an attendee's wireless communication device or computer. In this way, the attendee does not waste time, but only needs to inspect his or her folder when new images are provided.

After a folder is located, the attendee would remove the folder from the carousel and view the images and other image-related products. The attendee can remove the images from the folder and purchase one or more at the sales desk immediately or later during or after the event has ended. Other image-related items may be added to the folder for review and prospective purchase.

In operation, one embodiment of the present invention provides a card or other identification device to the attendee. The device may include a magnetic stripe, a bar code, or an RFID transponder. It may be a contact or contactless form of identification. It may be the attendee's mobile phone, Smartphone or other PDA. The device may also hold information that includes a unique reference number associated with the attendee. The device may correspond with the attendee's room number or room key. When the attendee is advised to look for their photos, the device is brought to the display area and appropriate hardware reads the unique reference number associated with the device and forwards it to an associated computer system. If the unique reference number is recognized, the system hardware may display a carousel number and shelf or tray number where the attendee may locate their photos. Alternatively, each carousel may be motorized and controlled by a computer that can also be linked to the device reader. Once the unique photo reference number is obtained, the carousel turns until the folder is positioned for convenient access by the customer. This automatic method ensures that a customer receives the folder from the correct slot and reduces errors. If the number provided by the attendee is not a unique attendee reference number or a unique folder identification code used to denote a folder, then a look up is done to determine the unique attendee identification number. For example, if the attendee scans his or her credit card, key card, or other device that is not physically linked to the display system device, the display system will use information in the event server to find the correct reference number or will assign a new reference number. Once the attendee is identified, the hardware and software will operate in the same manner.

In one embodiment it is possible to create additional products on speculation like photo CD's, photo books and other creative products like photo calendars. These types of products typically include one or more images of the guest and additional images of the venue. Once it has been determined that there has been sufficient images of the customer to produce these products, they are then produced and delivered to the customer's folder. One advantage of this system is that it allows that different products are placed in one location that is common and familiar to the customer.

One embodiment of the present invention employs a carousel that houses a plurality of digital display devices, which may be located in the folder. For example, one embodiment employs an iPad® or similar digital image viewing device that allows for viewing of digital images. The display device will have the ability to allow the attendees to purchases photographs, request specific editing of the photos, and order photo-related products. As one of skill in the art will appreciate, the digital display device also may be delivered to an individual's room or cabin, upon request. Security precautions may be taken to protect against theft of the display device. Such digital data may also be displayed on an individual's television or on the individual's personal computer or personal digital assistant (PDA) by transmitting the images by email or accessing the images on a website over the Internet or a specialized intranet.

Another embodiment contemplates that a customer may desire to receive additional existing photographs, products, or may wish to customize new photo products or photos. Thus, rather than make these products on speculation, the attendee can order them through an electronic interface kiosk, handheld device, portable or desk top computer, or an in-room interactive television system. When ordering, the attendee will be required to identify themselves either by providing their unique reference or identification number, their customer card or providing unique details about themselves, like a password, cabin number, date of birth etc. This verification allows their unique photo reference number to be linked to the product. Once created, the product can be placed in the folder ready for pick up at the customer's convenience.

In another embodiment of the present invention, a customer can order image and other image-related products after the event has ended. More specifically, one embodiment contemplates the ability for a customer to order a photo, photos or photo-related products online similar to that as described above.

It is another embodiment of the present invention to provide a system that employs character recognition software to identify individuals and photos. This system would employ a database to associate photos within an individual's assigned unique identifier. The photographs and other products made using the photos may then be printed and/or produced and positioned in the folder associated with the individual. This may be accomplished automatically or manually. In one embodiment, a printer is associated with each display device. A sensor or reader locates a folder associated with the particular attendee and an associated computer locates digital information associated with the attendee. The printer then prints identified photos or other products and the photos are automatically or manually deposited in the associated folder. The process is repeated for each customer or for each customer that has expressed a desire to obtain photographs. That is, some attendees may not wish to buy photos, some embodiments thus avoid printing photos associated with those individuals. The printer may remain stationary and the display system repositioned such that photos and other products exiting the printer are automatically deposited within the correct folder. There may also be a graphic interface associated with the display such that customers and/or vendors may input the unique identifier and the display repositions itself to position a desired folder at a known position in order that the customer and/or the vendor do not waste time searching for the desired folder.

The method and system of the present invention works with customers who have purchased rights to view, export and/or manipulate images prior to, during or following an event. For those customers who did not purchase rights prior to or during the event, or who did not purchase images or image-related products during the event, they can still access and acquire images after the event. In one embodiment, attendees of the event are provided images on electronic media, even if they have not purchased rights to the images. However, access to the images on the electronic media is restricted or blocked. The attendee can gain access to the blocked images by being provided an appropriate access code that is only provided to the attendee after the attendee purchases rights to the images. Alternatively, the attendee may access an authorized website, download the necessary software application, and provide contact and billing information in the same way as other customers did before and during the event. With the contact and billing information entered and saved to the event server, the attendee is given access to the images. As yet another alternative, the attendee may be given access to low resolution images or images with an obscuring watermark until the attendee purchases rights to the images in their native, or in some users edited, format.

The Summary of the Invention is neither intended nor should it be construed as being representative of the full extent and scope of the present invention. The embodiments described herein may be used in various combinations as described or independently. Moreover, references made herein to "the present invention" or aspects of the invention thereof should be understood to mean certain embodiments of the present invention and should not necessarily be construed as limiting all embodiments to a particular description. The present invention is set forth in various levels of detail in the Summary of the Invention as well as in the attached drawings and the Detailed Description of the Invention and no limitation as to the scope of the present invention is intended by either the inclusion or non-inclusion of elements, components, etc. in this Summary of the Invention. Additional aspects of the present invention will become more readily apparent from the Detail Description, particularly when taken together with the drawings.

BRIEF DESCRIPTION OF THE DRAWINGS

The accompanying drawings, which are incorporated in and constitute a part of the specification, illustrate embodiments of the invention and together with the general description of the invention given above and the detailed description of the drawings given below, serve to explain the principles of these inventions.

It should be understood that the drawings are not necessarily to scale. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

Figure 1:
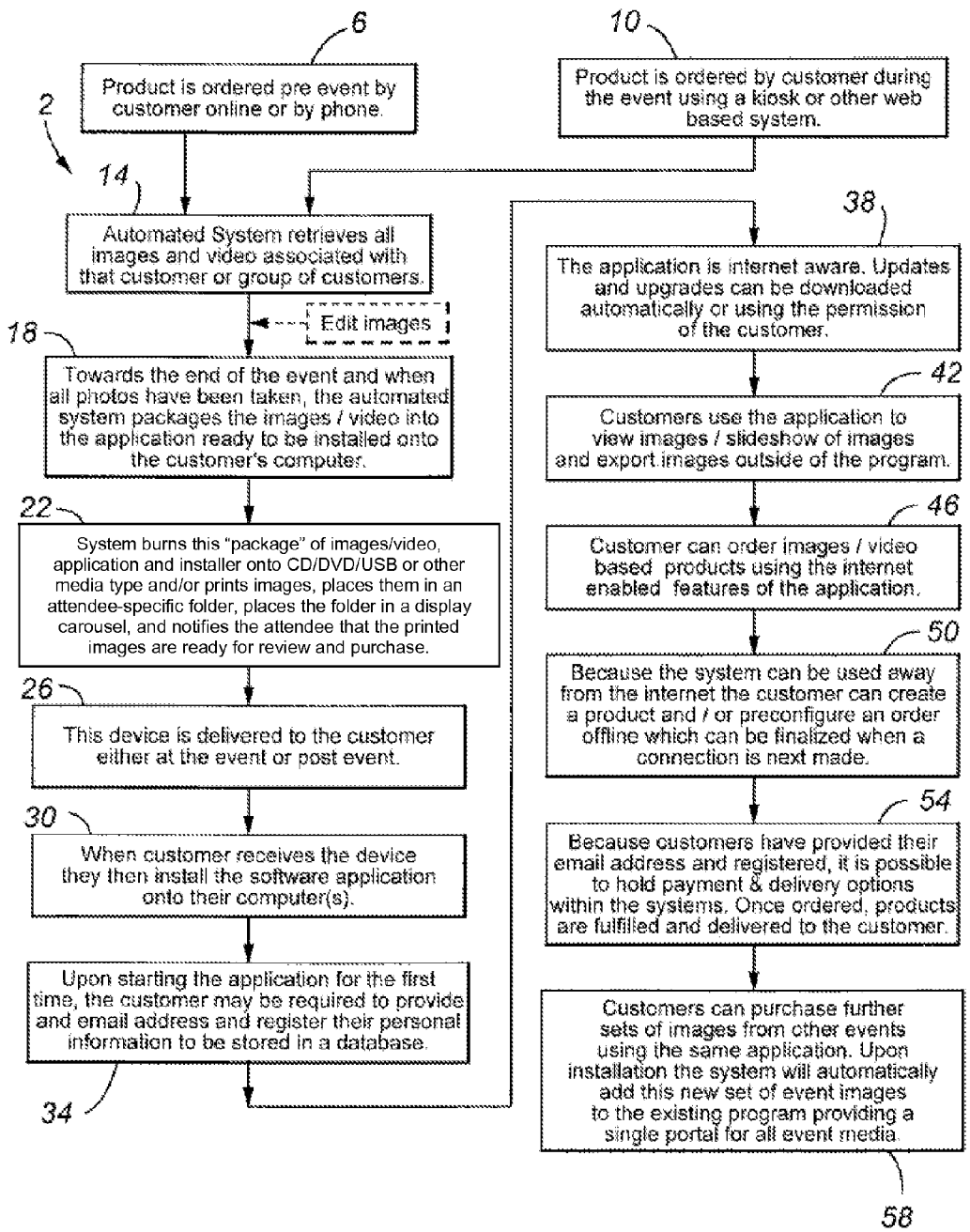
FIG. 1 is a process flow of one embodiment of the present invention.

FIG. 1 shows a workflow associated with a digital image system 2 of one embodiment of the present invention. Here, images are ordered by the customer pre-event 6, either online, by phone, by mail or by other means. It is contemplated that the customer would be aware of the ability to pre-purchase images by word of mouth, product marketing or having previously experienced a particular event. For example, a cruise line often sells photo packages before the cruise begins. Alternatively, a kiosk, other web-based systems or paper order forms may be provided by the event operator that allows ordering by the customer during the event 10. The individual may also be notified of the ability to purchase event images via an email, social media websites, invitation websites, or other similar means.

A photographer and/or videographer captures and saves images at the event. At or near the end of the event, an automated system retrieves all images associated with a customer or group of customers 14. For example, it is well known in the art to use identification cards employing magnetic strips, bar codes and RFID technology to facilitate linking of individual to image. In addition, facial or pattern recognition, or other known methods may be used to index and group images.

Towards the end of the event, all of the images are taken and uploaded into the digital photo system 2 for separation into a logical grouping. Such grouping may be customer specific, by cabin or room number, by an assigned or associated code, by individual identification, by family identification, etc. In one embodiment, the digital photo system includes a memory or database for storing images, software applications and a processor for logically grouping images and one or more user interfaces. The digital photo system 2 then packages the images together with a software application and/or installer program for delivery to the customer 18. In one embodiment, the images are delivered to the customer 22 via a solid state delivery means, such as CD, DVD, flash memory drive, memory card 26 or other electronic media. The images may also be delivered via a web-based download. Those of skill in the art will appreciate that the digital photo system 2 may also maintain the images in a form accessible via the Internet or via a specialized intranet by a customer upon entering a particular code or codes. In another embodiment, the one or more images may be printed and delivered to a folder associated with a specific customer. In any of these instances, the customer may be notified that his or her images were ready via an email, text, Twitter©, or similar notification or the customer would log on to an Internet or Intranet site at a later time to access to the digital photo system to obtain their images.

In one embodiment of the present invention, the customer would install the software application received from the event host onto a computer 30 to permit viewing, editing and manipulation of the images. Other embodiments of the present invention allow the user to obtain the application from one or more authorized websites on the Internet or specialized Intranet or by other means. Still other embodiments omit the need for application installation on a personal or home computer. More specifically, an Internet-based system may be provided that accesses the electronic media automatically, or when prompted by the event server. Once accessed, the customer would be able to copy and manipulate the images. The Internet-based system may possess the same functionality as an installed application or may redirect customers to other websites and/or applications that would provide desired functionality. In a related embodiment, a potential customer is given the electronic media that is accessed via an Internet-based application that provides limited access to the images stored on the electronic media (see the description of FIG. 2 below for a discussion of methods of providing pictures to potential customers).

When the application starts for the first time 34, the customer may be required to provide an email address and other information to be used by the application. Other information may include additional identification information as well as delivery and billing information. In one embodiment, the application is Internet aware. When the application is accessed, a connection is automatically made to the Internet to facilitate acquisition and downloading of software updates or upgrades 38. Such upgrades and updates may be downloaded automatically or upon permission of the customer.

In operation, the customers would use the application to view their images individually, via a slide show or any other means currently known 42. If the customer has purchased the images, they may be exported outside the application to the customer's computer, thereby allowing the images to be transferred to other media and computers, via social networking sites, email, etc. In one embodiment, the application links with a social networking site so that the customer does not need to export or otherwise transfer the images to the social networking site. The customer would also be given the ability to order images, videos and related products 46. Related products include, for example, calendars, mugs, clothing, photo books and other items incorporating images. Alternatively, the application may allow for only a limited number of copies to be made of the images, similar to the system employed by Apple's iTunes® music software. Thereafter, additional licenses must be obtained.

In one embodiment, the application will allow for the customer to preview image-based items prior to ordering. In addition, one embodiment of the present invention allows a customer to notify other potentially interested parties that the digital photo system 2 includes images that they may wish to obtain. Once invited, interested parties may access and purchase images or image-based products through a downloaded copy of the application or through a web browser and Internet connection. Those individuals, such as friends, relatives and acquaintances, may also, upon downloading the software, have the ability to interact with the images, download the images, and perhaps upload different images, which enhances the sharing process. Alternatively, after previewing the images in a digital or electronic format, the customer may order one or more images or image related products and have them delivered to the customer's folder in a display area.

The application may also allow for the customer to customize and order image-based products. For example, calendars, coffee mugs, post cards, business cards, paper weights, tee shirts, puzzles, etc. that incorporate an individual image or images. This may be done on-line via the application software, it may be done through a link or other interconnection to a web-based catalog system, or the application may be used in an offline configuration 50. This may be desirable to those who wish to preconfigure an order or create one or more related products offline at their convenience. The order would be automatically finalized when the application is next connected to the Internet or the application would cause the user to be automatically asked or prompted to finalize and submit the order. Finalized orders may be delivered to the customer's folder during an event, with appropriate notification of delivery to the customer, or may be shipped to an alternative location provided by the customer.

Because one or more of customer email addresses, payment information and delivery instructions may be stored in the system, such as at the time of initial registration, product orders may be promptly fulfilled 54. Customers may also access, edit and update their account information. In addition, the software application will allow customers to access and acquire images from other events hosted by the same or related event hosts using the same software. Similarly, images from other events may automatically be sent to an existing customer's account 58.

The event host or operator may also sell advertising and include it in the software application. The advertising may be available as a link to special offers or discounted pricing if the user agrees to view the advertising. It is a potential revenue source for the event host or operator.

Figure 2:
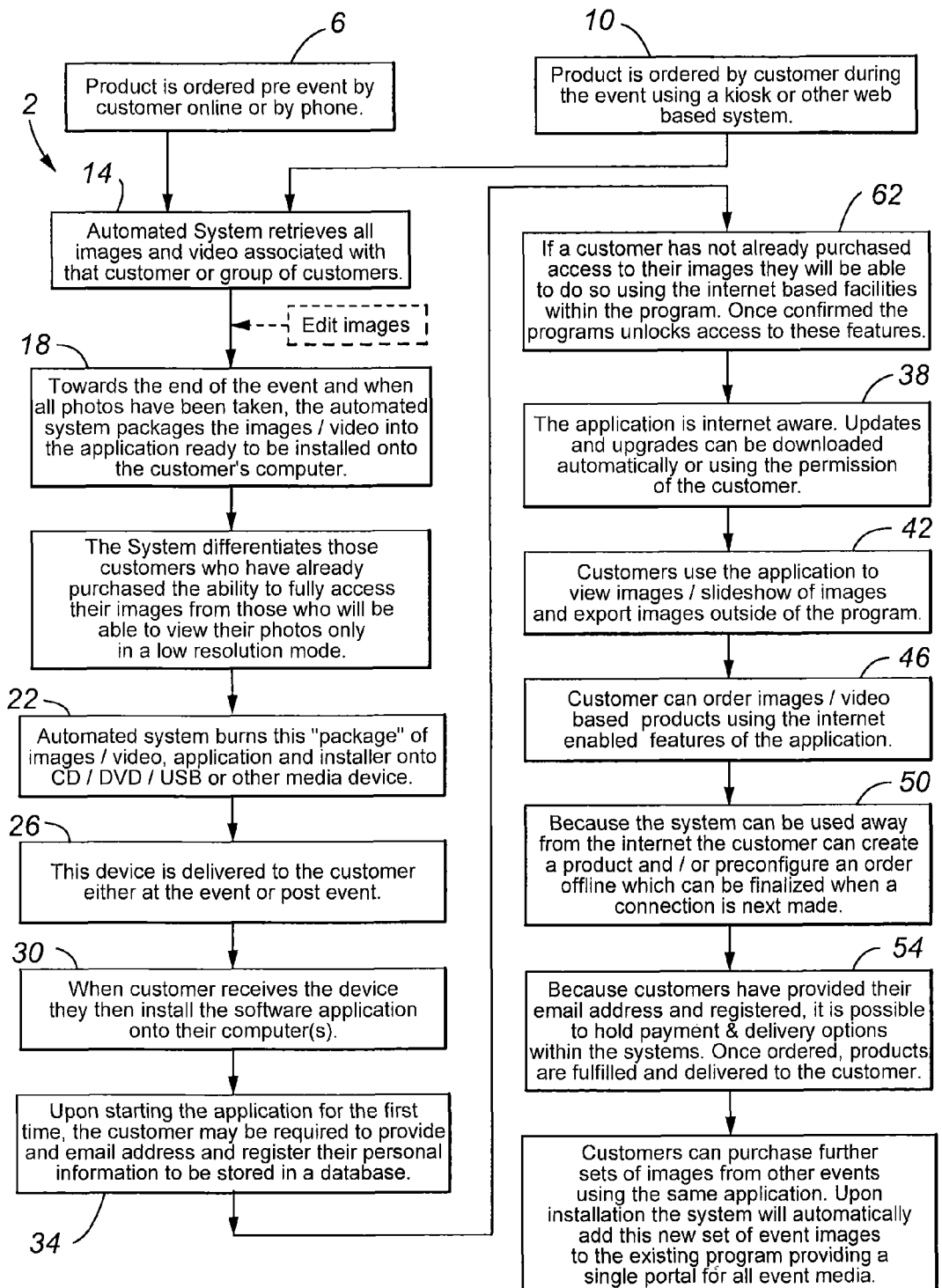
FIG. 2 is a process flow of another embodiment of the present invention.

FIG. 2 shows a work-flow associated with providing a set of images to a plurality of customers, some of whom have purchased the rights to view, export and use the images, and some who have not. For those who have purchased the rights, the work-flow operates as shown in FIG. 1.

For those who have not purchased rights to the images, the ability to purchase the images post-event is shown. Similar to the embodiment of FIG. 1, the digital photo system 2 provides images or electronic media, or otherwise makes the images available to all participants of the event 26. The potential customer would then install the application onto their home computer, iPad®, iPhone®, lap top, computer or any similar computer or smart phone 30. Customers who have already purchased access to their images would be able to do so using Internet-based facilities within the application. Those individuals who have not purchased images pre-event would be able to do so using Internet-based facilities in combination using the application 62 after an unlock code was entered. The unlock code is provided following completion of customer registration. Alternatively, if the potential customer would prefer to review the images before registering, the images may be altered to allow for a preview for a given amount of time and/or in a lower-resolution format. The altered images may also include a watermark or other means that would render copying undesirable or impossible. Once the potential customer paid for the rights to the images, high quality images would be provided by the application, sent as an email attachment or accessible via an Internet connection, to be copied and manipulated as described above in connection with the embodiment of FIG. 1.

Figure 3:
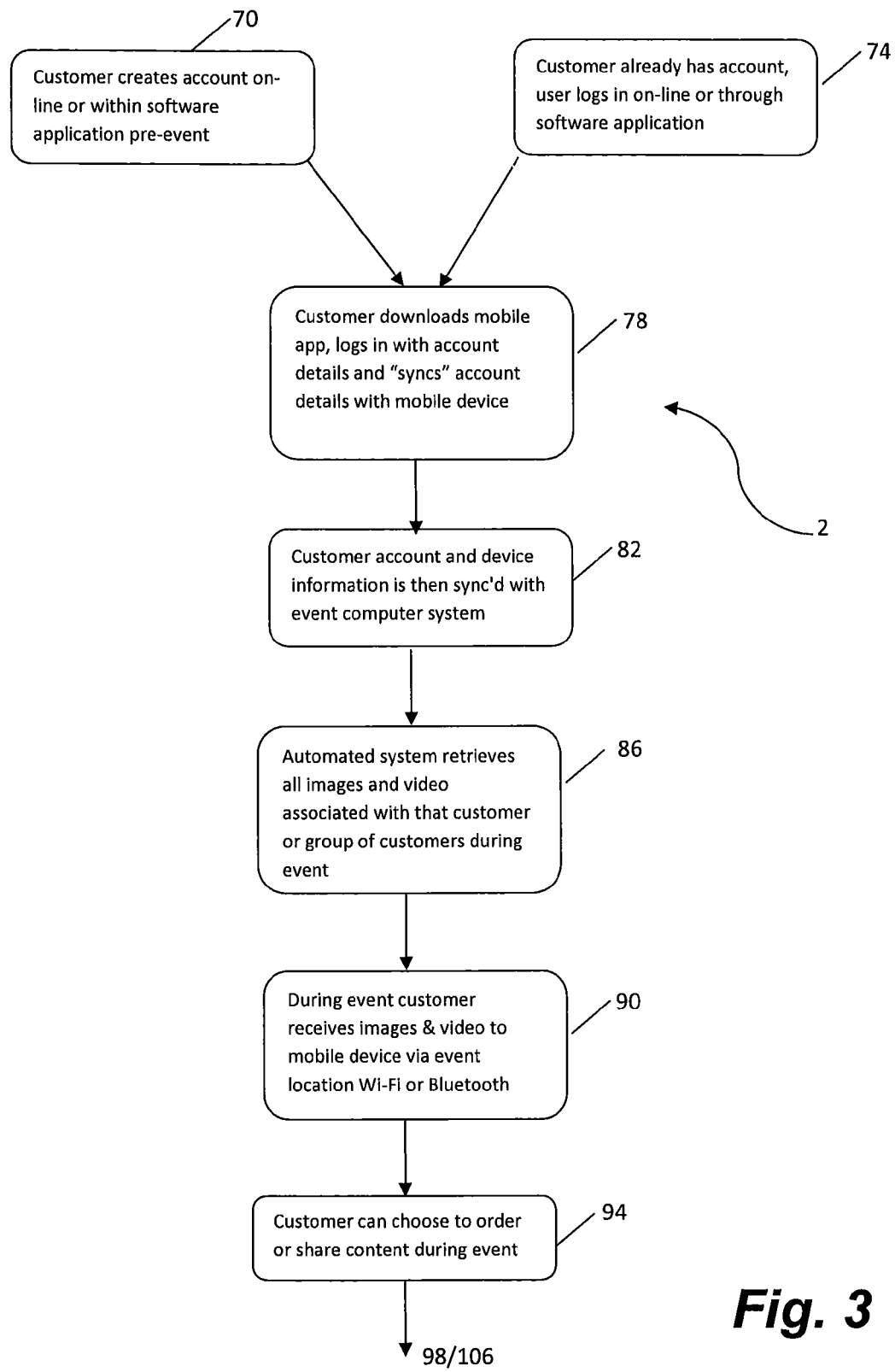
FIG. 3 is a process flow of yet another embodiment of the present invention.
Figure 3:
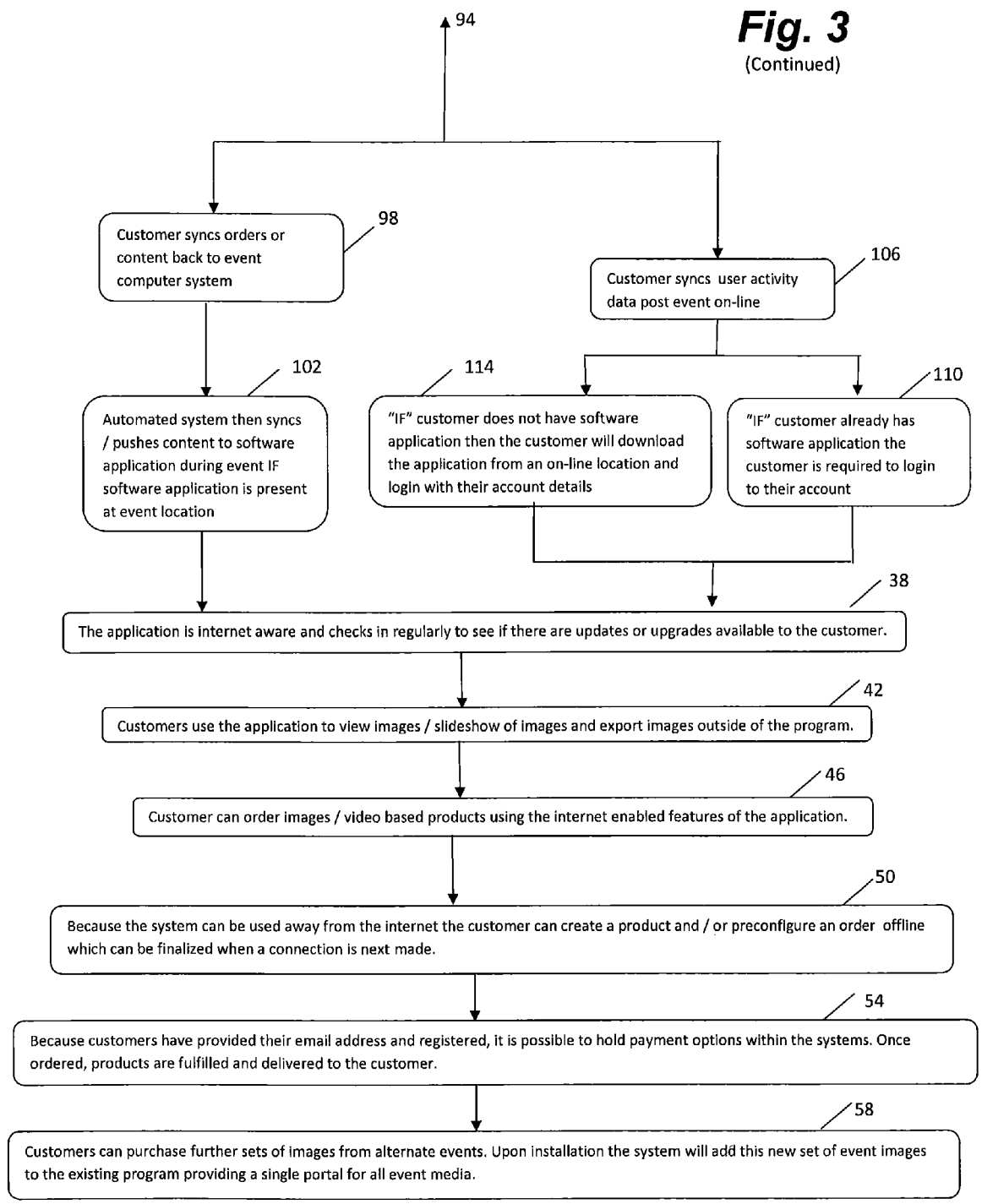

With respect to FIG. 3, still yet another embodiment of the present invention is shown that would be used by a customer via a computer, smart phone, iPad®, or other mobile cellular or web-enabled communication device, to store, view, display, manage and purchase images. This embodiment takes into account the connectivity of the device either via cellular, Wi-Fi or other wireless network technology and allows the customer to receive their images in almost real time and share their images with others during or after the event.

Prior to or during the event, a customer creates an account online 70 or accesses their existing account 74. The customer may download the necessary software to his/her mobile device or smart phone, such as a Blackberry®, iPhone® (hereinafter "mobile device"). Applications may be downloaded to more than one device. For example, this may be a mobile device and a laptop computer or it may be two different mobile devices controlled by two different people in a common group such as two parents, two siblings or two friends. The mobile application allows for a customer to log onto their account and sync with personal and event-specific information 78 obtained from the digital photo system 2. The connection between the event server and the mobile device would identify the mobile device and allow for synchronizing 82 of information between the mobile device and the event servers. Such information would include event details, customer pre-purchases and other personal information. The mobile device will receive instructions and settings on how to access the event servers if needed.

At the event, the automated system collects and retrieves all images associated with each customer or group of customers 86. Also at the event, the customer would connect their mobile device to the relevant network that an event operator is using. The mobile device uses the information provided by the operators' event servers to connect to and identify itself to the digital photo system. The event servers may also provide helpful information to the mobile device user such as the location of the photographer/videographer, wait times for access or guidance for obtaining quality images. In this embodiment, however, the receipt of images to an individual's wireless device is generally real-time 90. The images are delivered by any capable wireless communication mode. Alternatively, the images may be sent as an email attachment to an email account associated with the mobile device or other identified devices such as laptops or home computers. Images also may be delivered to the mobile device at a short time later or upon accessing a web-site via the mobile device or home computer, for example. Images may also be printed and delivered to the customer's folder. The customer would thus have the option of purchasing individual images or other products from the mobile device anytime during or after an event or in person at a display area during the event. The customers can also choose to share their event images with others who are attending the event or have been given access online 94. Those sharing with the customer may or may not be given full access to the images or they may be restricted to viewing lower resolution images. The customer would have the option of choosing to upload his/her images to someone else's mobile device during the event.

It is contemplated that prior to the end of the event, the customer may be reminded or prompted to complete the synchronization of their orders. If the customer has orders, those orders may be synched or sent back to the event server if this task is not already done 98. The automated system would then save and process the order and provide the selected images to the user's computer or mobile device if the software application is resident on the computer or device 102. Alternatively, the customer may choose to sync or provide their order online following the conclusion of the event 106. If the customer has an existing account and software application loaded on their computer and/or mobile device, all that is required is for the customer to login access the images and place their order 110. If the customer does not have the software application loaded on their computer or mobile device, the customer will be prompted to download the application software online at the linked site to the system or other appropriate website. The customer will be prompted to login once the software application is downloaded and the customer is appropriately registered 114. The remaining functionality of the application described with respect to FIGS. 1 and 2 may then also be used with respect to the embodiment shown in FIG. 3.

As a further alternative, some embodiments of the present invention may employ a dynamic identification system that uses wireless technology wherein the customer actively notifies an event operator or photographer of their desire to order an image at about the time the image is taken and, perhaps, before the image is taken. This may be accomplished by sending a signal from the user's mobile device to the event server or other wireless receiver that the customer wishes to purchase an image. For example, in one embodiment, a customer would initiate a signal from his/her wireless communication device, such as by way of a previously loaded application, that would notify the event operator or photographer that the image obtained or to be obtained was desired for purchase. The customer could send this signal while waiting in line for the photographer, while posing for the image or following taking of the image. The contemplated signal could be generated by a software application loaded on a wireless communication device or it could be a standard text message sent to a specifically designated text number associated with a particular photographer or location. The signal sent from the mobile device may include one or more of time, location (using GPS, for example) and/or otherwise stamped such that the event operator or photographer could easily link the image to the customer or potential customer. The server could also be linked with the photographer's camera or video equipment to record time, location and other identifying information for purposes of associating images and customers. Alternatively, a display screen or monitor could be located nearby to allow the customer to view the image and then promptly place an order as described. Further still, the software application may generate a custom-specific alpha numeric code, or display a bar code, QR code or any other computer readable code, on the screen of the mobile device which is scanned by the photographer and associated with the image or images taken by the photographer. The user-specific images may then be sent directly to the user's mobile device or any other device identified by the user and maintained in the server database. Alternatively, the images may be placed in the customer's folders perhaps along with other images and/or image related products the event holder believes the customer may be willing to purchase. In one embodiment, the technology is similar to the QR codes used by various airlines for their mobile boarding passes. It is contemplated that the customer or potential customer would have the ability to verify that an image was the image that they desired for purchase. Still other embodiments of the present invention allow for the customer or potential customer to expand the time window to allow them to view other images around the time that they requested their image.

If required, the customer may be instructed by the program to connect to a particular network or use a particular wireless technology when at the event to allow for connection to the event servers.

In another embodiment of the present invention, a customer employs their mobile device similar to that described in FIG. 3 to capture images of which they may or may not be the subject. More specifically, the application of one embodiment includes functionality that allows individuals to indicate to an event server that they are interested in purchasing images associated with specific time and/or location. During a sporting event, for example, it may be desirable to possess a high quality professional image of a certain sub-event of the main event. As such, freelance photographers, or photographers employed by the event operators, may submit their photos to a generalized event server. When a particular sub-event occurs, whether anticipated such as a record breaking homerun or unanticipated such as an overtime score, the interested customer may access the application via their mobile device and indicate that an image of that sub-event is desired. The system would then identify the mobile customer, identify the time and/or location stamp associated with the sub-event and match that information with images submitted by one or more photographers in the event system. Those images would then be transmitted to the customer for review. It is contemplated that the application may provide to the customer images for a specified time frame before and after the actual sub-event such as plus or minus 5, 10, 15 minutes, etc. from when they indicated their interest in the image. This would allow the user to view a narrow sub-set of images as opposed to viewing all the photos associated with the event. Alternatively, an individual may request all of those photos submitted in an event for review and purchase.

The methods described herein can be a set of computer-executable instructions executed by a computer system or processor and/or encoded or stored on a computer readable medium. Computer-readable medium refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible, non-transitory storage medium and prior art-recognized equivalents and successor media, in which the software implementations of the present invention are stored.

Referring now to FIGS. 4-8, embodiments of a physical display system of the present invention are shown that employ a plurality of rotating carousels 206. The carousels may be located at the event venue or some other convenient location. The carousels 206 are bounded by an upper member 210 and a lower member 214 and are interconnected to a shaft 218. The carousels 206 may be comprised of a plurality of independently rotating trays 222. At least one support bar 230 separates the upper member 210 from the lower member 214. The trays 222 of the carousel 206 define a plurality of levels that secure a plurality of folders 234. A divider 238 separates each folder 234 and may include a finger groove 242 that allows for individuals to rotate a respective carousel or tray 222. The display system 200 may also include a plurality of storage locations 246, such as drawers, positioned under the lower member 214 for use by the event holder. Further, the display system 200 may include lighting devices 250 or reflectors 254 to increase visual appeal.

Figure 4:
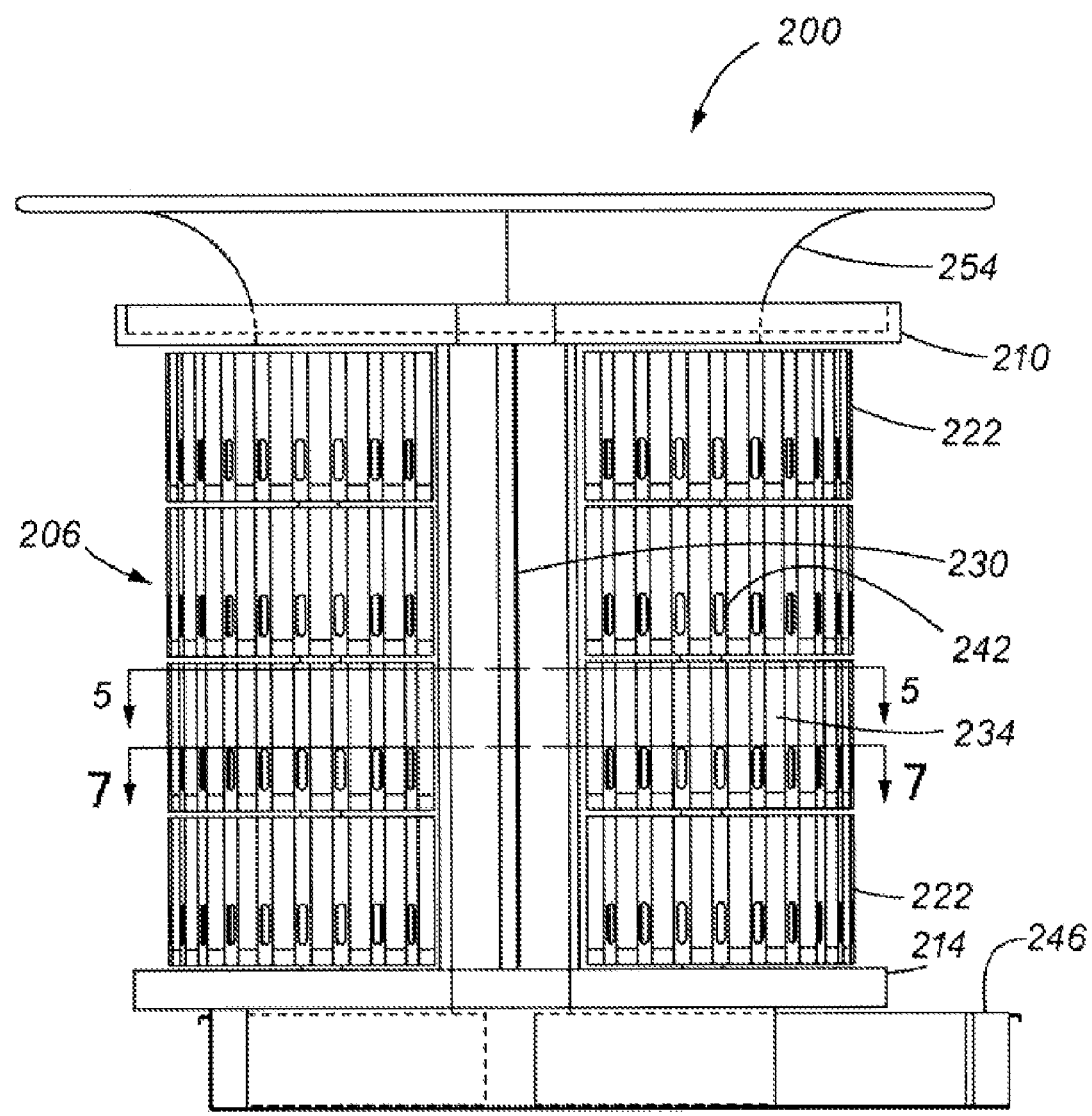
FIG. 4 is a front elevation view of one embodiment of a display in accordance with one embodiment of the present invention.
Figure 5:
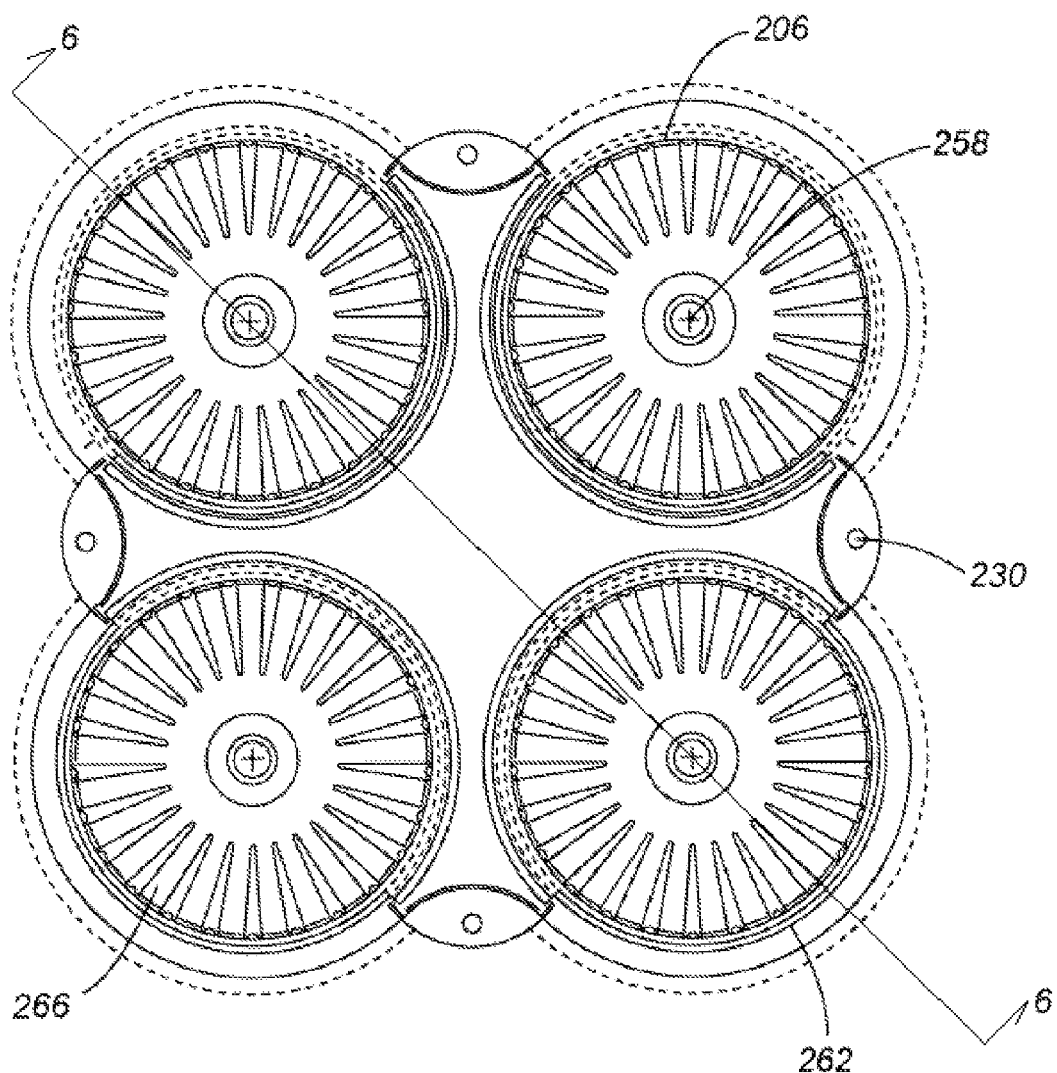
FIG. 5 is a cross sectional view taken along line 5-5 of FIG. 4.

Referring now specifically to FIG. 5, a cross section view of the display system of the embodiment of FIG. 4 is shown. Four support bars 230 are used to separate the upper member 210 from the lower member 214. Four carousels 206 are provided, but one of skill in the art will appreciate that any number of carousels 206 may be employed. Each carousel 206 is associated with an axle 258 that allows for the carousel 206 or the trays thereof to rotate. The carousels 206 are interconnected to the axle 258 via a bearing 270 or other mechanism. A sliding door 262 may also be employed that prevents access to the folders when required. Each tray includes a plurality of slots 266 for receiving a folder.

Figure 6:
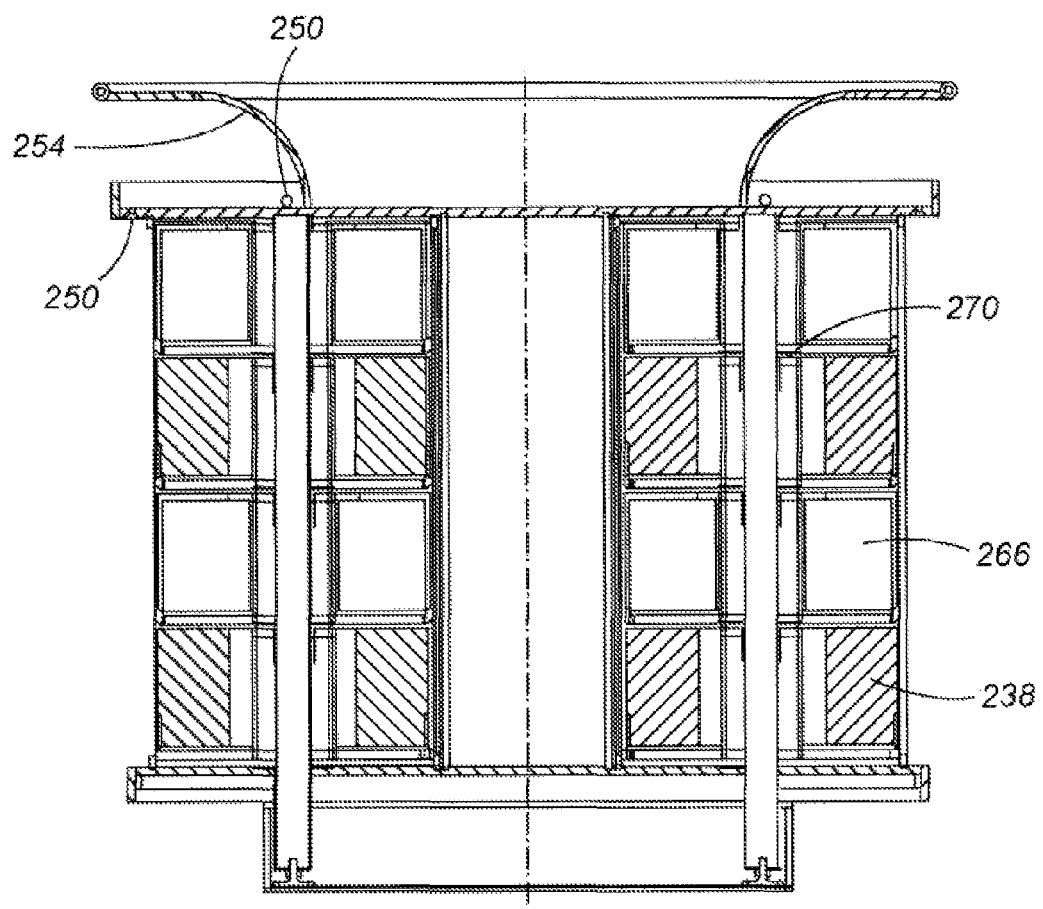
FIG. 6 is a cross sectional view taken along line 6-6 of FIG. 5.

FIG. 6 shows a plurality of lights 250 and reflectors 254 or other similar devices that may be employed to make the display system 200 more visible and aesthetically pleasing. The display system 200 may also indicate a particular level or carousel that contains an individual's pictures. More specifically, in one embodiment, an individual would scan their key card and a particular carousel 206 that contained their folder would be indicated by a light that would flash for a given amount of time. Alternatively, a light or other indicator proximally located with these folders would flash or light up to identify the location of the folder.

Figure 7:
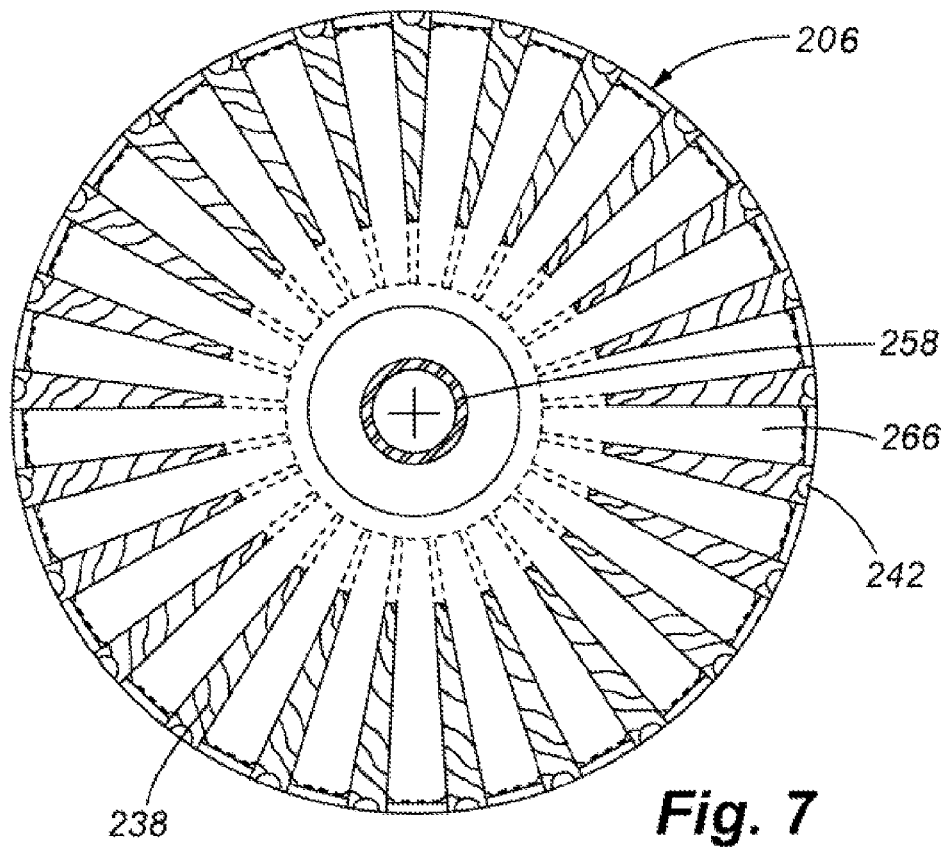
FIG. 7 is a cross sectional view taken along line 7-7 of FIG. 4.
Figure 8:
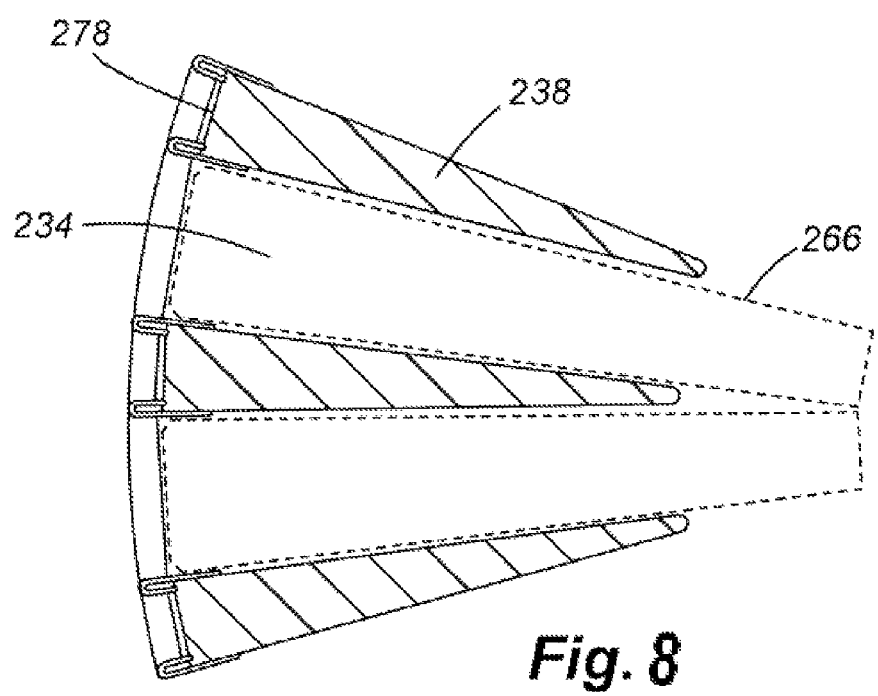
FIG. 8 is a detailed view of FIG. 7.

Referring now specifically to FIGS. 7 and 8, the carousel 206 includes a plurality of dividers 238 that define slots for receiving individual folders 234. The dividers 238 may include indicia 278 or other indications to identify the folder 234. The dividers 238 may also include lights or other mechanisms that draw an individual's attention to a particular folder. In one embodiment, the dividers 238 include finger grooves that allow for the individual to rotate the carousel. The dividers 238 may be removable to allow for extra space to accommodate larger or thicker folders.

Figure 9:
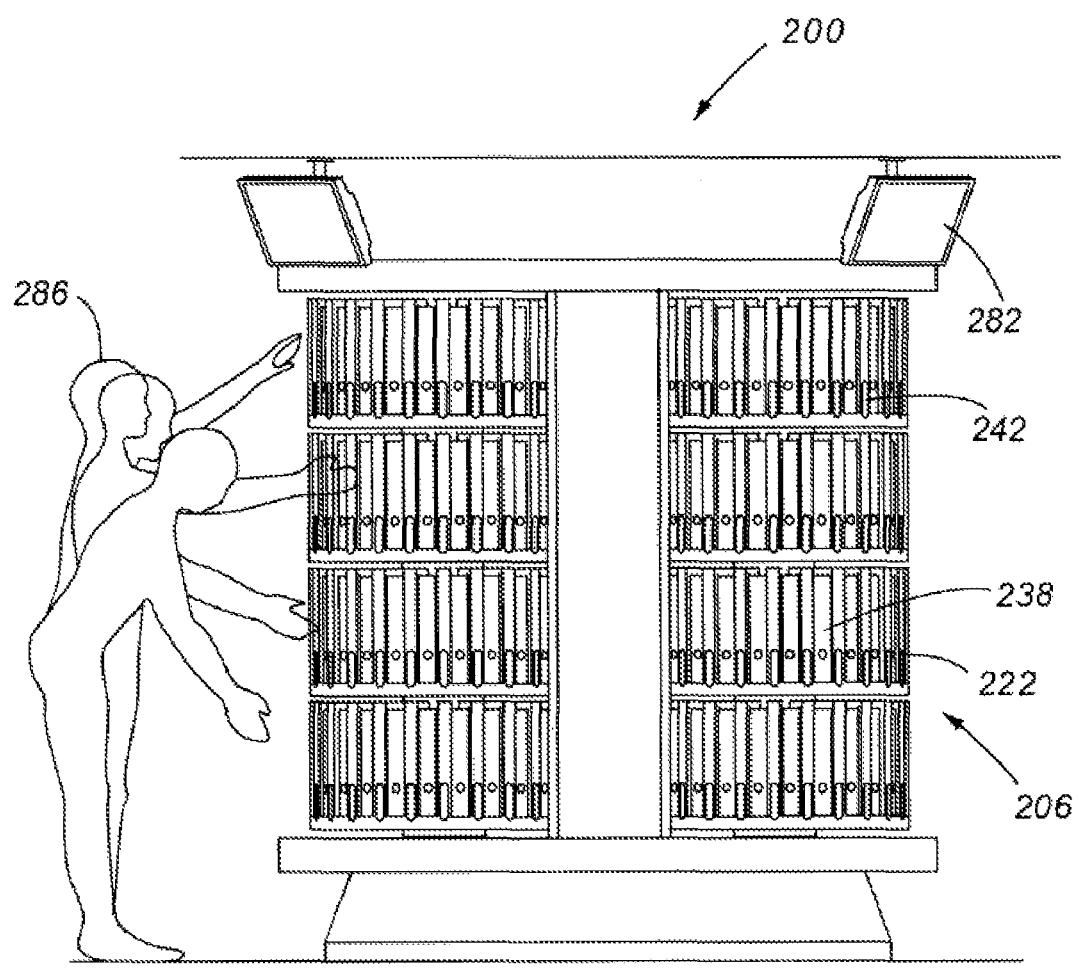
FIG. 9 is a front elevation view of another embodiment of the present invention.

FIG. 9 shows another embodiment of the present invention that employs at least one display screen 282 that helps the attendee 286 find their particular folder and may provide other helpful information or may be used to advertise image-related products available for sale.

Figure 10:
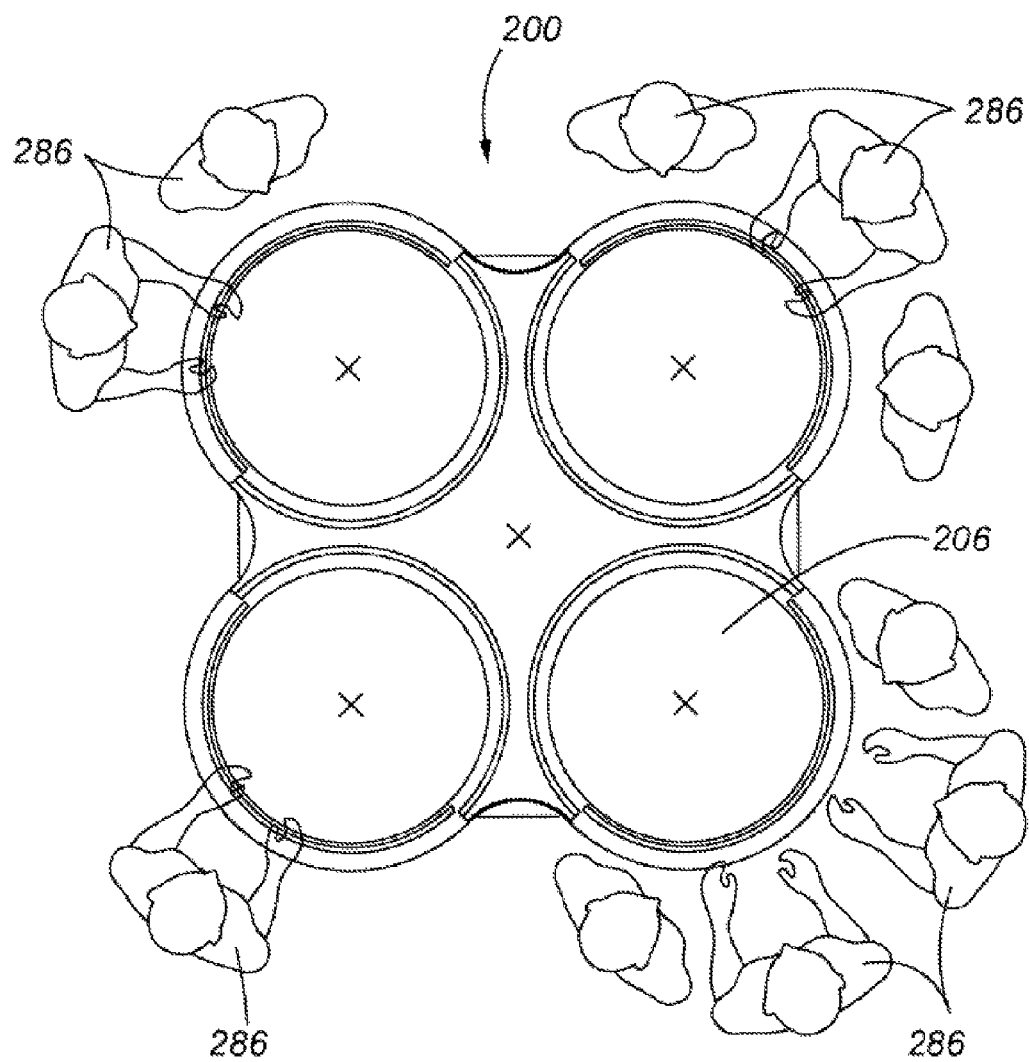
FIG. 10 is a top plane view of one embodiment of the present invention showing a plurality of customers accessing their respective folders.

FIG. 10 shows a representation of a display system 200 having four carousels 206 with attendees 286 located therearound. One of skill in the art will appreciate that this method of finding and viewing photographs has many advantages over the prior art displayed photographs on flat surfaces.

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein is capable of other embodiments and of being practiced or of being carried out in various ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

What is claimed is:

1. A method for providing images to an event attendee, comprising:
   obtaining an image of the attendee with a camera associated with an event server;
   accessing said event server to access said image;
   printing said image;
   placing said image in an attendee-specific folder;
   placing said attendee-specific folder in a display device, said display device employing at least one carousel; and
   providing a visual indication of the location of said folder within said display device when the attendee scans a code, swipes a card, enters a code, or swipes an RFID key card, said visual indication reminding the attendee of at least one of a physical location of said carousel and a physical location of said attendee-specific folder.

2. The method of claim 1, wherein said display device is automated wherein upon receiving an attendee prompt, said at least one carousel will rotate to place said folder adjacent to the attendee.

3. The method of claim 1, wherein said at least one carousel is comprised of independently rotating tiers.

4. The method of claim 1, wherein said display device includes at least one storage location.

5. The method of claim 1, further comprising linking said image with the attendee.

6. The method of claim 5, wherein said linking is achieved by facial recognition.

7. The method of claim 5, wherein the attendee is given a code that is used to link them to said image.

8. The method of claim 5, wherein the attendee links to said image by accessing a code from a wireless device and conveying said code to an event holder after said image is obtained.

9. The method of claim 8, wherein said code is conveyed wirelessly to said event holder.

10. The method of claim 8, wherein a photographer receives said code.

11. The method of claim 1, further comprising creating image-related products and placing said image-related products into said folder.

12. The method of claim 1, wherein the attendee provides an intention to review an image before said image is printed.

13. The method of claim 1, wherein said display device comprises at least one video monitor that is adapted to display advertisements related to image-related items.

14. The method of claim 1, further comprising notifying the attendee that said image has been placed in said folder.

15. The method of claim 1, wherein said event server comprises the hardware and operational software that stores images and attendee information, provides access to said images, and permits copying and manipulation of images.

16. The method of claim 1 further comprising transmitting a signal to said event server that would contain data identifying the attendee and the image.

17. The method of claim 14, wherein in notifying comprises sending a message to the attendee by way of at least one of a text, an email, the Internet, or an intranet site associated with the event.

18. The method of claim 1, further comprising:
   providing the attendee with access to a software application;
   providing the attendee with access to a digital version of said image; and
   allowing the attendee to purchase images using said software application.

19. The method of claim 18, wherein providing the attendee with access to digital versions of said image comprises establishing a connection to said event server that allows the attendee to view said image using the software application.

20. The method of claim 19, wherein establishing a connection to said event server using the software application comprises accessing the software application at a website using the internet.

21. The method of claim 18, wherein providing the attendee with access to digital versions of said image and providing the attendee with access to a software application comprises forwarding said image and said software application to the attendee.

22. The method of claim 21, further comprising:
   storing said image and said software application on an electronic readable medium and forwarding said electronic readable medium to the attendee.

23. A method for providing images to an event attendee, comprising:
   obtaining an image of the attendee;
   printing said image;
   placing said image in an attendee-specific folder;
   placing said attendee-specific folder in a display device, said display device employing at least one carousel; and
   providing a visual indication of the location of said attendee-specific folder within said display device when the attendee scans a code, swipes a card, enters a code, or swipes an RFID key card, said visual indication reminding the attendee of at least one of a physical location of said carousel and a physical location of said attendee-specific folder.

24. The method of claim 23, further comprising providing a card reader in the general vicinity of said carousel, said card reader reminding the attendee of the location of said attendee-specific folder when said card is scanned, swiped, or otherwise accessed by said card reader.

25. The method of claim 24, wherein a visual indication of said attendee-specific folder location triggered when said card is scanned, swiped, or otherwise accessed by said card reader.

26. The method of claim 1, wherein said visual indication comprises blinking lights on said carousel.

27. The method of claim 1, wherein said visual indication comprises blinking lights associated with the specific location of said attendee-specific folder.

* * * * *